UNITED STATES PATENT OFFICE.

HEINRICH F. D. SCHWAHN, OF KANSAS CITY, MISSOURI.

PROCESS OF PURIFYING ALUMINOUS MINERALS.

SPECIFICATION forming part of Letters Patent No. 514,089, dated February 6, 1894.

Application filed October 4, 1892. Serial No. 447,854. (No specimens.)

*To all whom it may concern:*

Be it known that I, HEINRICH F. D. SCHWAHN, a citizen of the United States, residing at Kansas City, in the county of Jackson and State of Missouri, have invented certain new and useful Improvements in Processes of Purifying Minerals Containing Alumina, of which the following is a full, clear, and exact description.

The invention relates to a process by which minerals containing alumina may be purified from iron and other impurities for use in the arts, manufacture of the iron-free salts of aluminum or for other industrial purposes, and my invention consists in certain features of novelty hereinafter described and pointed out in the claims.

In carrying out my process, I take for example some ordinary clay and I have the same roasted or calcined and ground to a fine powder, and with the same I first mix hydro-chloric and nitric acids preferably of commercial strength and preferably diluted with water as a vehicle. Then I mix the resulting mass preferably in a closed receptacle provided with a suitable agitator under constant stirring with sulfuric acid preferably of 66° Baumé. The resulting gases I preferably confine within the receptacle to be absorbed by the mass which should be soft like mortar and therefore the quantity of water to be added must be regulated accordingly. The nitro-hydro-chloric and sulfuric acids react upon each other and the intermixed iron is thereby changed into ferric-chlorid which is separated by evaporation with the waste nitro-hydrochloric acid to be recovered as by products. The evaporation I carry out in any suitable sublimation furnace as usually employed for such purpose. Other impurities like calcium-oxid, baryta, magnesia, &c., which may have been present are more or less transferred into sulfates according to the quantity of sulfuric acid used, and said impurities are separated according to their nature as soluble or insoluble sulfates by washing or floating. The alumina has more or less also changed its condition, and the same if previously in a hydrous state will be converted into anyhdrous alumina. Besides this the same is more or less carried into a sulfate which can be omitted by using exactly only so much of sulfuric acid, as is necessary to carry on the above specified reaction. Therefore in each case the amount of acids to be used must be ascertained first by analysis or experiment but in general about one-half pound of nitric acid and about one pound of hydro-chloric acid diluted with about ten pounds of water and about one and one-half pound of sulfuric acid are sufficient quantities for one-hundred pounds of clay, &c.; but instead of using already-made hydro-chloric and nitric acids of commerce as above described, I mix the crude material to produce said nitric and hydro-chloric acid, namely, nitrate of soda or potassa (saltpeter) and chlorid of sodium (common salt) with the said minerals containing alumina, and the said chlorid of sodium and nitrate I preferably add in form of a solution made with water and then I decompose with sulfuric acid to create the same reaction as above. The reason I make this variation is for cheapening and improving the process, as the nitric and hydro-chloric acids are applied in this way in their nascent condition, which will improve the reactions, and which in some cases is absolutely necessary to make a perfect decomposition, especially if the aluminous ore is in form of a hard mineral like emery, &c., but the essential parts of the process are the same as above stated. I therefore add so much chlorid of sodium and nitrate as seems necessary to produce the corresponding necessary amount of the nitric and hydro-chloric acids. The resulting sulfate of soda or potassa from the decomposed chlorid of sodium or nitrate can be separated like other soluble sulfates by lixiviation or washing and recovered as by product. The crude materials to produce said nitric and hydro-chloric acids are added to the clay, &c., in the ratio of about two pounds of chlorid of sodium, about one pound of nitrate, about ten pounds of water and about three pounds of sulfuric acid to one-hundred pounds of said clay, &c., and these given quantities are in general sufficient.

The mode of operation is the same in either case whether I employ the ready-made acids of commerce or the crude material therefore to produce the said acids in the course of the process which is as follows: first, roasting or calcining the clay, &c., and grinding the same; second, mixing of the resulting powdered mass with nitric and hydro-chloric acid or with the crude material therefor; third, mixing the resulting mixture with sulfuric acid; fourth, heating of the resulting mass to evaporate and expel the waste nitro-hydrochloric acid and produced ferric-chlorid; subsequently, washing and floating to finish the purification of the minerals containing alumina.

I claim as my invention—

1. The improved purification of minerals containing alumina, consisting in roasting or calcining and grinding, and treating of the same with nitric, hydro-chloric and sulfuric acids in the manner as specified; then expelling and evaporating of the produced ferric-chlorid and waste acids by heating the resulting decomposed mass, subsequently washing and floating to finish the purification, all as and for the purpose set forth.

2. The process of purifying minerals containing alumina which consists in roasting or calcining and grinding, then mixing with the same hydro-chloric and nitric acids or the crude material therefor to produce the same, namely, chlorid of sodium and nitrate of soda or potassa, then adding to the resulting mixture sulfuric acid, then heating of the decomposed mass and evaporating and expelling of the waste nitro-hydro-chloric acid and produced ferric-chlorid, subsequently washing and floating to finish the purification, substantially as and for the purpose set forth.

HEINRICH F. D. SCHWAHN.

Witnesses:
JOHN T. MARSHALL,
HENRY STUBENRAUCH.